United States Patent
Hautman et al.

(10) Patent No.: US 7,712,315 B2
(45) Date of Patent: May 11, 2010

(54) AUGMENTOR VARIABLE VANE FLAME STABILIZATION

(75) Inventors: Donald J. Hautman, Marlborough, CT (US); Derk S. Philippona, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 981 days.

(21) Appl. No.: 11/407,668

(22) Filed: Apr. 20, 2006

(65) Prior Publication Data

US 2007/0245743 A1   Oct. 25, 2007

(51) Int. Cl.
*F02K 3/10* (2006.01)

(52) U.S. Cl. .......................................... 60/763; 60/765
(58) Field of Classification Search ............ 60/761–766
See application file for complete search history.

(56) References Cited

U.S. PATENT DOCUMENTS

| | | | | |
|---|---|---|---|---|
| 2,835,108 A | * | 5/1958 | Peter ........................... | 60/765 |
| 3,595,024 A | * | 7/1971 | Kohler et al. .................. | 60/251 |
| 3,646,763 A | * | 3/1972 | Arand .......................... | 60/768 |
| 4,003,201 A | * | 1/1977 | Lewis et al. ................... | 60/262 |
| 4,064,692 A | * | 12/1977 | Johnson et al. ................ | 60/762 |
| 4,527,390 A | * | 7/1985 | Mar et al. ..................... | 60/224 |
| 4,817,378 A | * | 4/1989 | Giffin et al. ................... | 60/762 |
| 4,899,539 A | * | 2/1990 | Gastebois et al. ............. | 60/762 |
| 5,269,138 A | * | 12/1993 | Conete et al. ................. | 60/763 |

* cited by examiner

*Primary Examiner*—Michael Cuff
*Assistant Examiner*—Phutthiwat Wongwian
(74) *Attorney, Agent, or Firm*—Carlson, Gaskey & Olds

(57) ABSTRACT

A flameholder for an augmentor rotates about an axis radially positioned with a turbine engine. The flameholder is in a streamlined position when the augmentor is not operating to minimize pressure loss and radar cross-section and a turbulent position when the augmentor is operating. A linkage connects the flameholder to an actuator to control the rotational position of the flameholder on the axis. Bypass airflow from the fan cools the flameholders and linkages. The length of the linkages can be varied from one flameholder to another to create asymmetric heat release within the augmentor to avoid screech.

21 Claims, 4 Drawing Sheets

AUGMENTOR VARIABLE VANE FLAME STABILIZATION

BACKGROUND OF THE INVENTION

The invention generally relates to an improved arrangement to provide a variable geometry flameholder in a turbine engine. More particularly, an inventive flameholder provides a streamlined geometry when a turbine engine augmentor is not operating and a "turbulent" geometry when the augmentor is operating.

Turbine engines may have afterburners, or augmentors, located at the rear of the engine upstream of an exhaust nozzle. Augmentors utilize unused oxygen from the turbine engine to obtain a second combustion. The second combustion provides additional thrust from the turbine engine. An augmentor includes flameholders to create low velocity wakes to stabilize combustion in the high velocity turbine engine exhaust.

Flameholders have the disadvantage of creating pressure loss in the airflow of the turbine engine even when the augmentor is not operating. The pressure loss when the augmentor is not operating decreases the thrust of the turbine engine.

Prior turbine engine augmentors have attempted to utilize flameholders of varying geometry such that the flameholder is arranged to provide a more streamlined airflow when the augmentor is not operating. In one known turbine engine, the spraybars and flameholders were arranged in concentric rings about the inner case of the turbine engine. Actuators for moving the flameholders were located within the inner case in order to reach the flameholders. However, due to the excessive heat within the turbine engine the components required for varying the flameholder position have had limited lifespan. Therefore, variable geometry flameholders have provided limited use in application.

An arrangement to provide a variable geometry flameholder which has increased durability is needed.

SUMMARY OF THE INVENTION

A variable geometry flameholder for an augmentor according to this invention is cooled by bypass airflow from a turbine engine.

The augmentor includes vanes radially spaced about the center of the turbine engine. Each vane houses a spraybar to provide fuel to mix with leftover oxygen for a second combustion. A flameholder is located aft of each vane and rotates about an axis also radially spaced about the center of the turbine engine. A linkage connects the flameholder to an actuator to control the rotational position of the flameholder on the axis. Bypass airflow from the fan flows through the bypass duct of the turbine engine. The bypass airflow cools the linkages and the surface of the flameholder.

The flameholder is moved to a streamlined position when the augmentor is not operating and a position to create low velocity wake when the augmentor is operating. The length of the linkages are varied from one flameholder to another to vary the amount of rotation in the augmented positions creating asymmetric heat release to mitigate or avoid combustion dynamic instabilities or screech. The actuators and linkages may also be arranged to vary the rotation the flameholder based upon the aircraft speed and altitude to obtain the desired combustion stability without requiring undue actuation force.

The example flameholders of this invention include a variable geometry while providing increased durability.

These and other features of the present invention can be best understood from the following specification and drawings, the following of which is a brief description.

DETAILED DESCRIPTION OF THE PREFERRED EMBODIMENT

Figure 1:
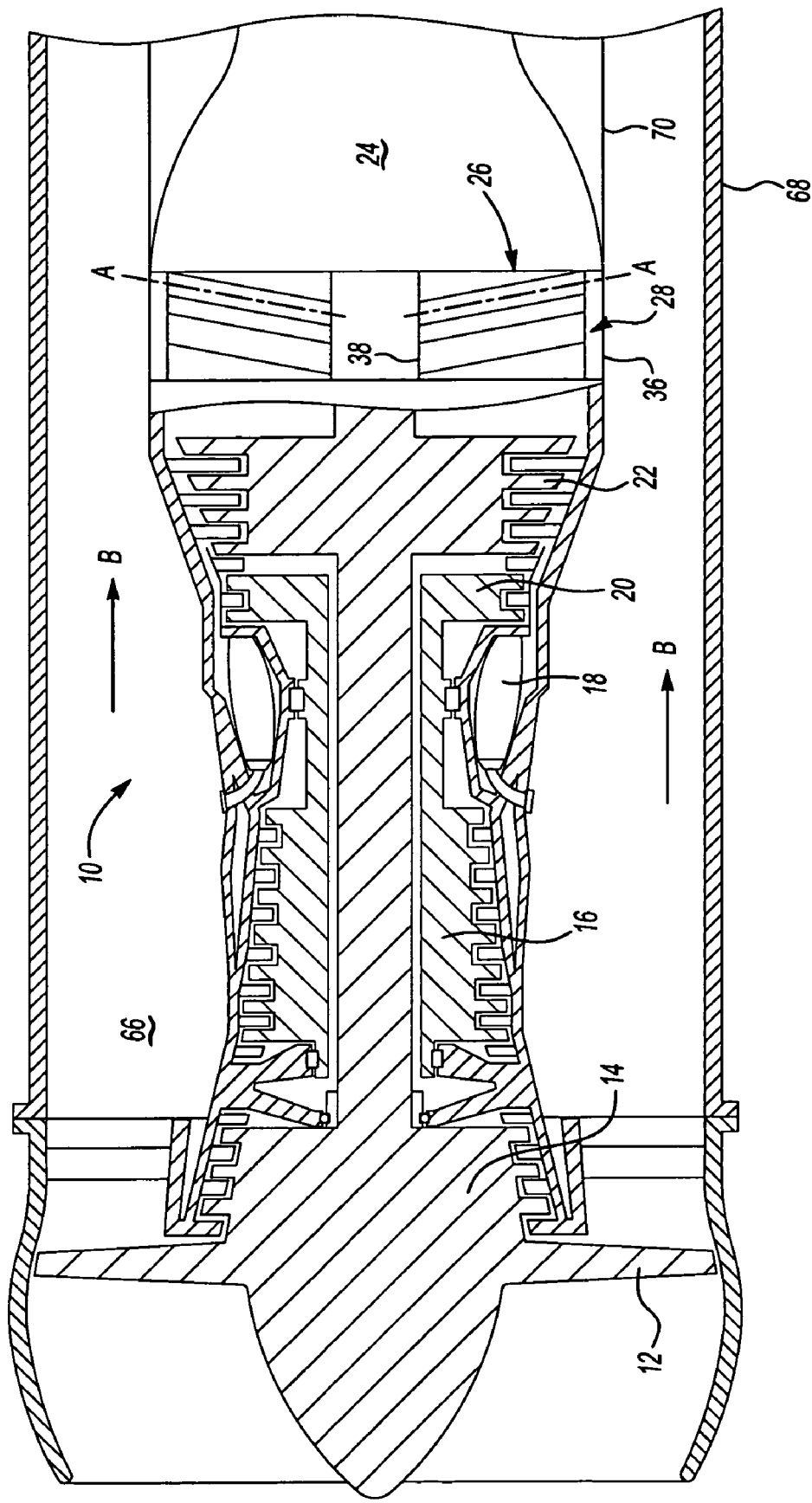
FIG. 1 is a schematic view of a turbine engine with an augmentor.

FIG. 1 is a schematic view of a turbine engine 10. Air is pulled into the turbine engine 10 by a fan 12 and flows through a low pressure compressor 14 and a high pressure compressor 16. Fuel is mixed with the oxygen and combustion occurs within the combustor 18. Exhaust from combustion flows through a high pressure turbine 20 and a low pressure turbine 22 prior to leaving the engine through the exhaust nozzle 24. The example engine 10 includes an afterburner, or augmentor 26. A turbine exhaust case 28 is located in front of the exhaust nozzle 24 and behind the low pressure turbine 22 to house the augmentor 26.

Figure 2:
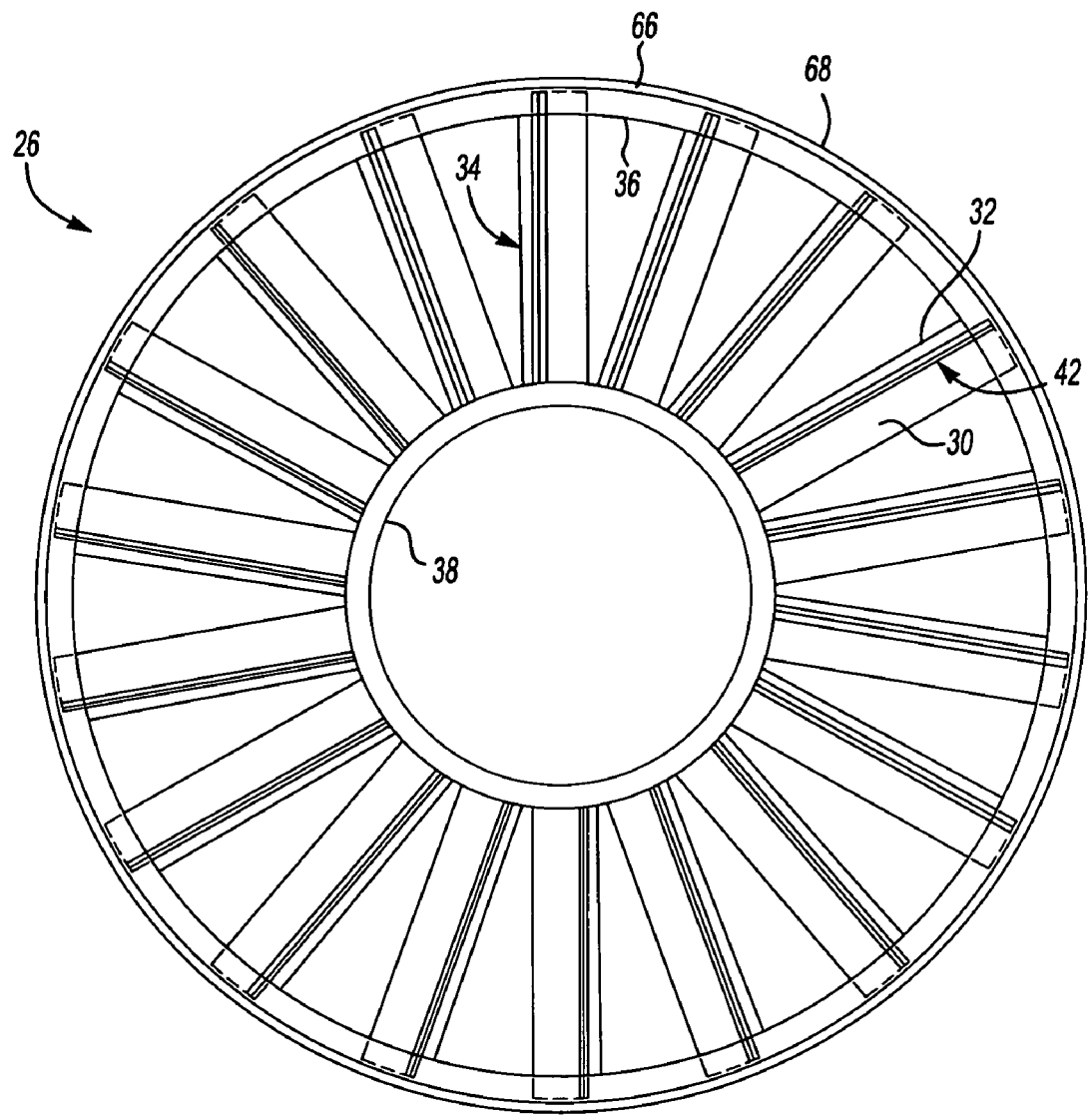
FIG. 2 is an end view of the augmenter according to this invention.

Referring to FIG. 2 an end view of the augmentor 26 looking upstream into the engine 10 is shown. Air flows into the augmentor 26 at the leading edge 30 and exits at the trailing edge 32. The augmentor 26 includes vanes 34 positioned between a turbine exhaust outer case 36 and a turbine exhaust inner case 38. The vanes 34 are spaced about the turbine exhaust inner case 38. A flameholder 42 is located aft of each vane 34.

Figure 3:
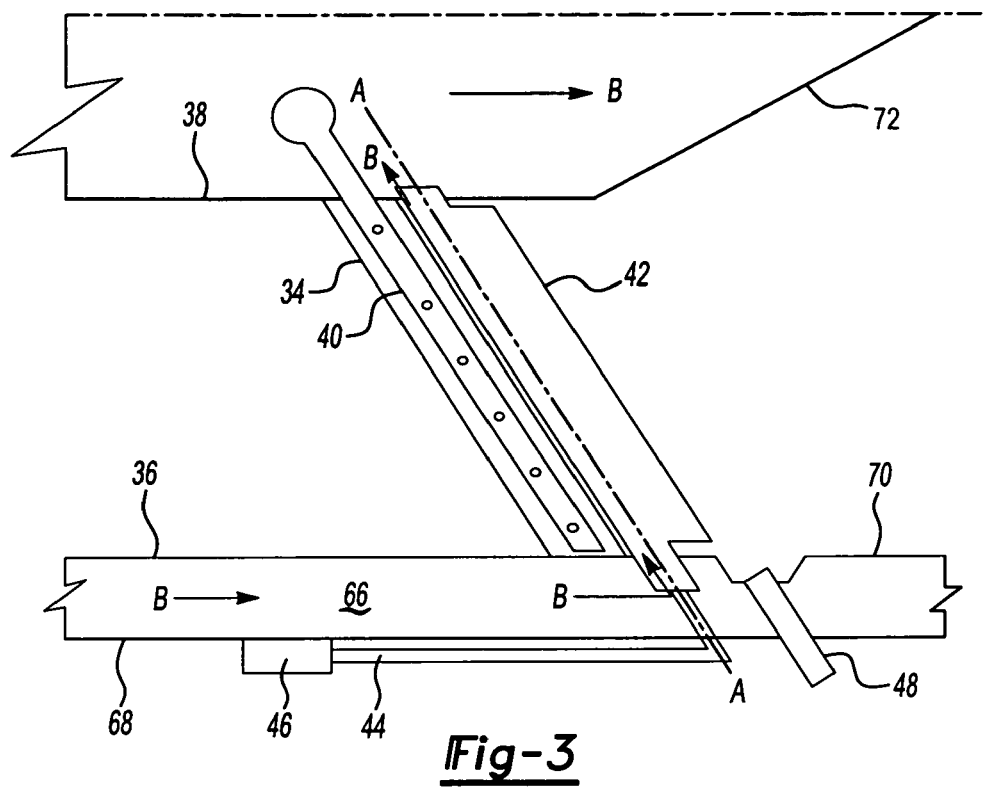
FIG. 3 is a section of the augmentor showing an example vane and flameholder.

FIG. 3 is a section of the augmentor 26 showing an example vane 34. The vane 34 is positioned between the turbine exhaust outer case 36 and the turbine exhaust inner case 38. Each vane 34 houses a spraybar 40 to provide fuel to mix with leftover oxygen for a second combustion. A spark igniter 48 extends from the turbine exhaust outer case 36. The spark igniter provides the spark to begin the second combustion when fuel is expelled from the spraybar 40 and the vane 34.

As shown, the spraybar 40 extends radially within the vane 34 between the turbine exhaust outer case 36 and the turbine exhaust inner case 38. The flameholder 42 is located aft of the vane 34 and rotates about an axis A. The axis A is substantially parallel to the associated spraybar 40 as shown. A linkage 44 connects the flameholder 42 to an actuator 46. The actuator 46 and the linkage 44 control the rotational position of the flameholder 42 on the axis A. The other flameholders 42 spaced about the augmentor 26 are connected to the same or additional linkages 44 and actuators 46 as explained below. The actuator 46 may be powered by an electric, hydraulic, or fuel source obtained from another portion of the turbine engine 10.

Bypass airflow, as indicated by arrow B, from the fan 12 flows through a bypass duct 66 defined by an engine outer case 68. The bypass airflow cools the linkages 44. A portion of the bypass airflow exits the bypass duct 66 and is used to cool the surface of the flameholder 42. As indicated by arrow B the bypass airflow enters the interior of the flameholder 42 adjacent to the linkages 44. The interior of the flameholder 42 is hollow to allow airflow to pass through. Cooling holes are located on the surface of the flameholder 42 to allow the bypass airflow from the interior of the flameholder 42 to cool the exterior of the flameholder 42.

In one embodiment the bypass airflow exits the flameholder 42 to the turbine exhaust inner case 38. From the turbine exhaust inner case 36 the bypass airflow can also enter the interior of the vanes 34. The bypass airflow cools the vanes 34 and tail cone 72 through cooling holes formed in the surfaces of the vanes 34 and the tail cone 72. Bypass airflow that does not enter the flameholder 42 continues through the bypass duct 66 to cool the surface of augmentor liner 70 through additional cooling holes. The remaining bypass airflow exits the bypass duct 66 at the end of the augmentor liner 70 and exits the turbine engine 10 with the exhaust gases through the nozzle 24.

Figure 4A:
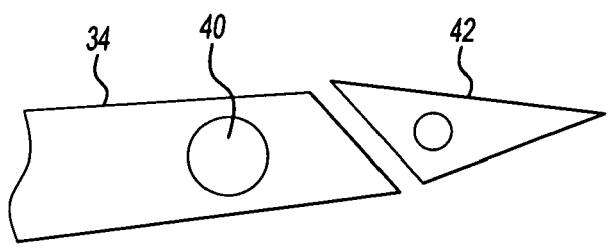
FIG. 4a illustrates a cross-section through the example flameholder in the streamlined position.
Figure 4B:
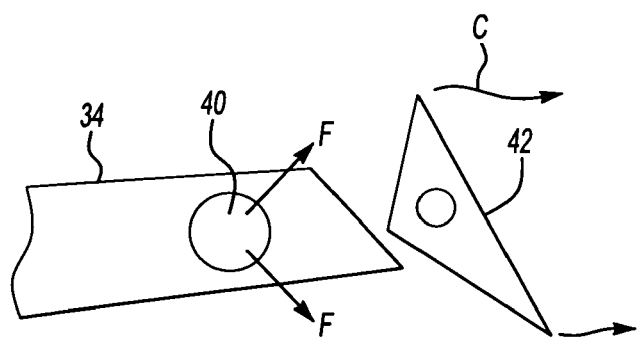
FIG. 4b illustrates a cross-section through the example flameholder in the turbulent position.

FIGS. 4a and 4b show a cross-section through the example vane 34 and the flameholder 42 looking from the turbine exhaust inner case 38 toward the turbine exhaust outer case 36. FIG. 4a illustrates the flameholder 42 in the streamlined position when the augmentor 26 is not operating. FIG. 4b illustrates the flameholder 42 in the "turbulent" position which is used when the augmentor 26 is operating. The flameholder 42 is not limited to the triangular geometry shown. One skilled in the art would be able to design any geometry which would provide for a streamlined shape to minimize pressure loss and radar cross section when in the non-augmented position and a "turbulent" shape in the augment position to achieve stable combustion.

The spraybar 40 sprays fuel out of the vane 34, as depicted by arrows F. The spark igniter 48 (shown in FIG. 3) initiates combustion.

Figure 5:
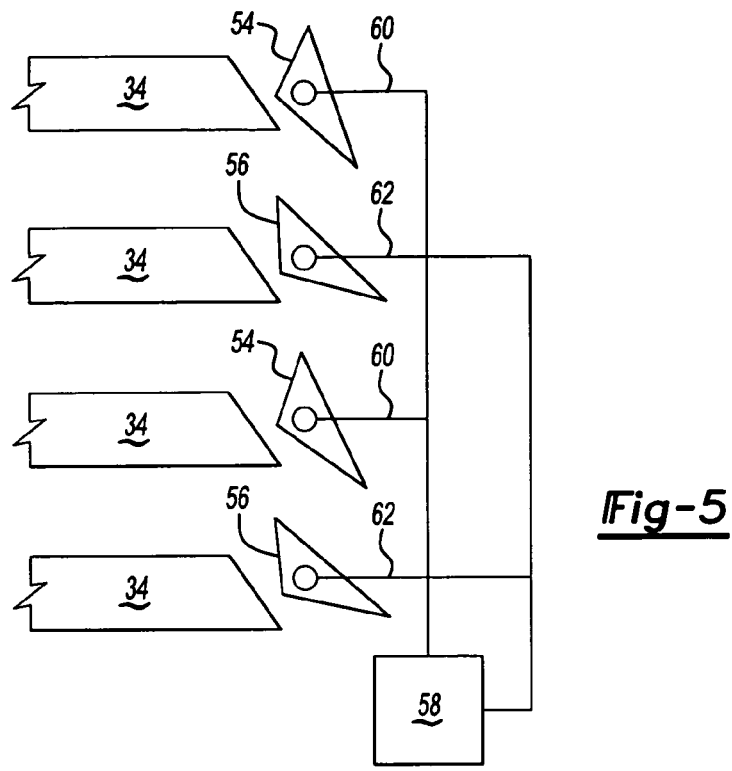
FIG. 5 illustrates a schematic view of a portion of the example flameholders in utilizing multiple linkages to obtain varying turbulent positions.

Referring to FIG. 5, asymmetric heat release can also be achieved by varying the turbulent positions of the flameholders 54 and 56. The asymmetric heat release avoids exciting the acoustic modes within the exhaust nozzle 24. Excitation of an acoustic mode results in a thermo-acoustic phenomena referred to as screech, which can damage the components of the turbine engine 10.

The turbulent position of the flameholders 54 and 56 is achieved by the actuator 58 and the linkages 60 and 62. Each flameholder is attached to the actuator 58 through one of the linkages 60 and 62. By varying the length of the linkages 60 and 62 from one another the associate flameholders 54 and 56 vary in position relative to one another. The amount of rotation between the streamlined position and the "turbulent" position is varied between flameholder 54 and 56 creating asymmetric airflow within the exhaust nozzle 24. In this manner a different "turbulent" positions of the flameholders 54 and 56 may be obtained by replacing the linkages 60 and 62 with another of a different length. One skilled in the art would be able to determine the length and variations required in the linkages to obtain a desired amount of asymmetry to avoid screech modes. A worker in the art would be able to design appropriate linkages to make the selected components.

Figure 6:
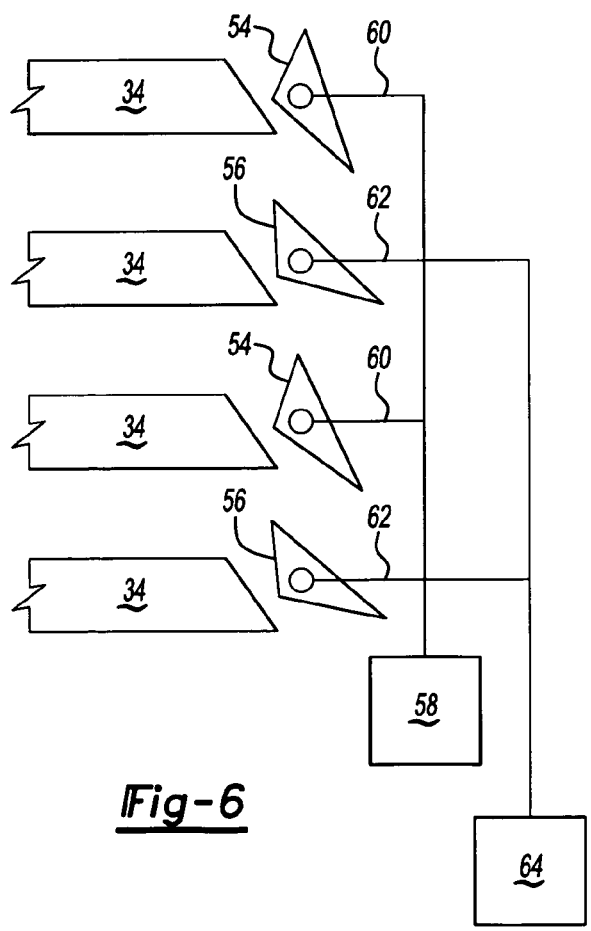
FIG. 6 illustrates a schematic view of a portion of the example flameholders utilizing multiple actuators to obtain varying turbulent positions.

Alternately, FIG. 6 illustrates the linkages 60 and 62 may be equal in length and an additional actuator 64 may be provided. The flameholders 54 and the linkages 60 are attached to the first actuator 58 and the flameholders 56 and the linkages 62 are attached to the additional actuator 64. The actuators 58 and 64 are configured to rotate the associated flameholders 54 and 56 by different amounts than each other.

Turbine engines 10 primarily use augmented airflow at take-off or to assist the aircraft in obtaining supersonic speeds. Additionally, the altitude and airspeed of the aircraft when augmentor operation begins during flight may vary. When the aircraft is operating at low altitudes but high speeds the force required to rotate the flameholders 54 and 56 is increased. However, the low altitude and high speed create ideal conditions for combustion within the exhaust nozzle 24 and less wake width of the flameholders 54 and 56 is required. The actuators 58 and 64 and linkages 60 and 62 may be arranged to rotate the flameholders 54 and 56 a partial amount to create the necessary wake width but without requiring the actuators 58 and 64 to exert undue force.

Alternately, high altitudes and low speeds create much lower pressure within the exhaust nozzle 24. The force required to rotate the flameholders 54 and 56 is decreased. However, the lower pressure in the exhaust nozzle 24 requires more wake width by the flameholders 54 and 56 to assist combustion. Therefore, the actuators 58 and 64 and linkages 60 and 62 may be arranged to rotate the flameholder 42 a greater amount to create larger wakes in this situation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a turbine exhaust inner case and a turbine exhaust outer case spaced radially outwardly relative to the turbine exhaust inner case and radially inwardly of an engine outer case;
   a plurality of fuel spraybars circumferentially spaced apart from each other about the turbine exhaust inner case and extending in a radial direction from the turbine exhaust inner case to the turbine exhaust outer case, wherein each fuel spraybar is housed within a vane; and
   a flameholder associated with each of the plurality of fuel spraybars, wherein each flameholder is movable;
   an actuator linkage connecting an actuator to the flameholders; and
   a cooling air supply for the flameholders and the actuator linkage.

2. The turbine engine of claim 1, wherein each flameholder is positioned aft of the associated fuel spraybar and vane.

3. The turbine engine of claim 1, wherein each flameholder rotates about an axis extending radially from the turbine exhaust inner case to the turbine exhaust outer case.

4. The turbine engine of claim 1, wherein the actuator and at least a portion of the actuator linkage is located on the turbine engine outer case.

5. The turbine engine of claim 1, wherein the cooling air supply is bypass cooling air provided through a bypass duct of the turbine engine.

6. The turbine engine of claim 1, including a plurality of actuators for moving the flameholders.

7. The turbine engine of claim 1, where each flameholder is in a streamlined position when a turbine engine augmentor is not operating and in a turbulent position when the turbine engine augmentor is operating.

8. The turbine engine of claim 7, where the turbulent position of the flameholder is determined based on altitude and speed of an aircraft.

9. A turbine engine augmentor comprising:
a plurality of fuel spraybars circumferentially spaced about a turbine exhaust inner case and extending radially outwardly to a turbine exhaust outer case spaced radially inwardly of an engine outer case, wherein each fuel spraybar is housed within a vane; and
a plurality of flameholders, wherein one of the plurality of flameholders is positioned aft of each of the fuel spraybars and associated vane, and wherein the plurality of flameholders are driven to rotate.

10. The turbine engine augmentor of claim 9, wherein an actuator drives the plurality of flameholders to rotate about an axis that extends radially from the turbine exhaust inner case to the turbine exhaust outer case.

11. The turbine engine augmentor of claim 10, wherein the actuator is located on the turbine engine outer case.

12. The turbine engine augmentor of claim 9, where the flameholder is in a streamlined position when the turbine engine augmentor is not operating and in a turbulent position when the turbine engine augmentor is operating.

13. The turbine engine augmentor of claim 12, wherein the turbulent position of the flameholder is determined based on altitude and speed of an aircraft.

14. The turbine engine augmentor of claim 12, wherein a first plurality of flameholders is connected to a first actuator for controlling the rotational position of the first plurality of flameholders, and a second plurality of flameholders are connected to a second actuator for controlling the rotational position of the second plurality of flameholders, and the turbulent position of the first plurality of flameholders is a different rotational position than the turbulent position of the second plurality of flameholders to obtain asymmetric heat release.

15. The turbine engine of claim 1, wherein associated flameholders and fuel spraybars are generally parallel to each other.

16. The turbine engine of claim 15, wherein each fuel spraybar has a first end associated with the turbine exhaust inner case and a second end associated with the turbine exhaust outer case and wherein each fuel spray bar is inclined such that the second end is positioned aft of the first end.

17. The turbine engine of claim 2, wherein associated vanes, flameholders, and fuel spraybars each extend from the turbine exhaust inner case to the turbine exhaust outer case and are generally parallel to each other.

18. The turbine engine of claim 1, wherein each fuel spraybar includes a plurality of openings to spray fuel out of the vane and toward the flameholder.

19. The turbine engine augmentor of claim 9, wherein each fuel spraybar has a first end associated with the turbine exhaust inner case and a second end associated with the turbine exhaust outer case and wherein each fuel spray bar is inclined such that the second end is positioned aft of the first end.

20. The turbine engine augmentor of claim 9, wherein the vanes extend radially from the turbine exhaust inner case to the turbine exhaust outer case, and wherein each fuel spraybar includes a plurality of openings to spray fuel out of the vane and toward the flameholder.

21. The turbine engine augmentor of claim 20, wherein associated vanes, fuel spraybars, and flameholders are generally parallel to each other.

* * * * *